US009292831B2

(12) United States Patent
Burns et al.

(10) Patent No.: US 9,292,831 B2
(45) Date of Patent: Mar. 22, 2016

(54) MONITORING DATA ELEMENTS ACROSS MULTIPLE NETWORKS AND PROCESSES

(71) Applicants: Christopher Burns, Brunswick, ME (US); John Woolley, Gulf Stream, FL (US)

(72) Inventors: Christopher Burns, Brunswick, ME (US); John Woolley, Gulf Stream, FL (US)

( * ) Notice: Subject to any disclaimer, the term of this patent is extended or adjusted under 35 U.S.C. 154(b) by 0 days.

(21) Appl. No.: 14/049,581

(22) Filed: Oct. 9, 2013

(65) Prior Publication Data

US 2015/0188786 A1 Jul. 2, 2015

(51) Int. Cl.
*G06F 15/173* (2006.01)
*G06Q 10/10* (2012.01)

(52) U.S. Cl.
CPC .................................... *G06Q 10/10* (2013.01)

(58) Field of Classification Search
None
See application file for complete search history.

(56) References Cited

U.S. PATENT DOCUMENTS

| | | | | |
|---|---|---|---|---|
| 7,334,001 | B2 * | 2/2008 | Eichstaedt | G06F 9/542 |
| 8,214,329 | B2 * | 7/2012 | Gilder | G06F 17/30566 707/622 |
| 8,782,033 | B2 * | 7/2014 | Jiang | G06F 17/30864 707/710 |
| 2012/0197848 | A1 * | 8/2012 | Bhagwan | G06Q 50/22 707/687 |
| 2014/0365640 | A1 * | 12/2014 | Wohl | G06K 7/10227 709/224 |

* cited by examiner

*Primary Examiner* — Kenny Lin

(57) ABSTRACT

The invention described here is a computer-related method for analyzing and reporting the current status of a wide array of processes and conditions across multiple networks and systems. It employs independent software entities called "Blades" to control the retrieval, analysis and characterization of each situation, combined with a common presentation system that displays those characterizations in a simple graphical vocabulary for expressing degrees of positive and negative significance. By employing Tiles or similar independent graphical reports, shown together on the screen of a desktop computer, notebook, tablet, mobile device or wearable interactive display, the invention described here allows the user to see his or her world at a glance.

5 Claims, 5 Drawing Sheets

| ***Condition*** | ***Value*** | ***Alert*** | ***Alert Text*** |
|---|---|---|---|
| Condition 1 | 50+ | Green Blnk | Beautiful Day |
| Condition 2 | 40+ | Green | Good Weather Tomorrow |
| Condition 3 | 30+ | Amber | Fair Weather Tomorrow |
| Condition 4 | 20+ | Red | Poor Weather Tomorrow |
| Condition 5 | 20- | Red Blnk | Weather Warning |

MONITORING DATA ELEMENTS ACROSS MULTIPLE NETWORKS AND PROCESSES

CROSS REFERENCE TO RELATED APPLICATIONS

None

FEDERALLY SPONSORED RESEARCH

Not Applicable

SEQUENCE LISTING OR PROGRAM

Not Applicable

FIELD OF THE INVENTION

This invention relates to the process of efficiently monitoring changes in diverse data elements across different networks and processes.

BACKGROUND OF THE INVENTION

Prior Art

In the last fifty years, as information systems emerged to control communications networks, industrial processes, medical situations and other complex environments, it became common systems design practice to build in alerting systems that would report to the user whenever an event occurred that was out of the normal range. The intent was that the new information systems could help identify, diagnose, and even correct the problems as they arose. But recent studies have concluded that alert systems often disguise or obscure the underlying condition, with sometimes disastrous results. These systems create an aura of "certitude" around the information they present that makes the report seem more truthful than it really is. They fail to handle ambiguity, which is often a critical factor in the analysis, and they lack corroborating evidence over time and across a range of other indicators that might allow more subtle and more accurate correlations. And because of their poor track record for relevance and accuracy, the systems are often ignored[1]:

[1] Examples are from Burns, Christopher, *Deadly Decisions: How False Knowledge Sank the Titanic, Blew up the Shuttle, and Led America Into War*, Prometheus Books, 2007.

- When the pilot of Korean airliner KAL 007 incorrectly entered the latitude and longitude of their destination into the autopilot system, the system alarms went off to indicate that the destination was not normal. Knowing that the system was sometimes wrong, the pilot switched off the warning and took off. The plane flew off course into Soviet airspace and was shot down, killing all aboard.
- As the nuclear power plant at Three Mile Island began to overheat, the temperature inside the reactor was reported by the system to be 600°; suggesting that the facility was not in danger. It was later determined that the alert system had been programmed to report temperatures up to 600°, but not higher, because the programmer could not imagine a circumstance where higher temperatures might occur. In fact the reactor was on the verge of meltdown, and only the operator's intuition saved it.
- When the USS Vincennes detected a plane approaching their ship in the Persian Gulf, the crew could not determine whether it was an enemy attack or a friendly fly over. The tracking system was unable to record and report this ambiguity, so it labeled the approaching plane as "enemy," and the commercial airliner was shot down.

The purpose of the invention described here is to create an alternative method for monitoring the status of multiple situations with a single application, and characterizing the status of each one in a simple way to tell the User whether additional attention is required.

Conventional Alert Systems:

Conventional alert systems have several characteristics in common: (FIG. 1)

Process (100): All alerts draw data from a computerized process of some kind in which the activities can be quantified.

Rules (115): Most alerts incorporate a set of rules that define which data elements should be monitored and when each of those elements is out of normal range.

Exceptional Event (120): When a data element is determined to be out of normal range, the system creates an exceptional event—a snapshot of the circumstances surrounding the abnormality, including time, location, and type.

Create Alert (125): The exceptional event is converted to an alert—usually a message encapsulating the data surrounding the event, often including a preliminary interpretation and alternative actions that might correct the problem.

User Device (130): Alerts are sent to the user device where the person responsible for the process is expected to take action.

Alert System Examples

U.S. Pat. No. 7,982,598 Method for Integrating User Notifications and User Alerts on an Electronic Device, Bonansea et al/Access Co (2011)

This simple example of an alerts system monitors multiple processes and advises the user of incoming phone calls, system and program failures, a conflict for resources, downloads in progress, updates pending, or event reminders, presented as a small window, a status indicator, or a full screen. But this flow of alerts from different applications, at different levels of importance, in different formats, can be distracting to the user, and they are often ignored.

Bonansea addresses the problem by intercepting alerts when they occur and determining the type and importance of each one (high, medium, and low priority) based on rules established by the user. Once those alerts are graded, they are presented on the user's device, along with graphics, sound, and additional text in a manner appropriate to their priority. While high priority alerts are presented immediately, occupying the whole screen with an accompanying audible signal, medium priority alerts may be suppressed or delayed. Low priority alerts may be presented on the device status bar or simply added to a list of notices to be reviewed as time permits. The presentation of each alert may include actions available to the user to answer, input data, snooze, ignore, or dismiss.

U.S. Pat. No. 7,143,118, Method and System for Alert Delivery Architecture, Eichstaedt, et al/Yahoo (2006)

Another example of an alert management system monitors the process and collects events as they occur, following the rules for what constitutes an exceptional event. The user may choose to have the system process and report the events as they occur, or report them only on demand.

In each case the system "normalizes" the event record, expanding and interpreting the codes provided by the process, and adding environmental information such as the time of the event, ID of source, and event type. Duplicate reports are eliminated and tags are added to the alert report to assist later search and analysis functions. Finally the alerts reports are logged and either sent to the user immediately or stored for later delivery on request.

U.S. Pat. No. 7,171,689 System and Method for Tracking and Filtering Alerts in an Enterprise and Generating Alert Indications for Analysis, Bearvers/Symantec (2007

In this example, the alerts management system monitors system "devices"—software and hardware elements that are integral to an enterprise communications network such as the server, firewall, modem, workstation, router, remote machine, intrusion detection, authentication server, and network management system.

"Device Experts" or rules, are designed to detect when a specific system element is out of normal range, then the program translates the event into a standard report format such as XML, text, or name:value pairs. The rules add additional information to the report, including the time and location of the event, the device involved, and other environment information. The resulting alert is then reported to the user.

These systems, while useful in managing complex processes, are less reliable when reporting the status of thousands of personal situations that are now monitored and even managed by digital systems. A solution is required that is broader in the time and scope of its coverage, more sensitive to ambiguities, and better designed to take advantage of the human brain's great capacity for watching patterns and correlating diverse signals.

SUMMARY

The invention described here is a computer implemented method for analyzing and reporting the current status of a wide array of processes and conditions across multiple networks and systems. It employs independent software entities called "Blades" to control the analysis and characterization of each situation, combined with a common presentation system that displays those characterizations in a simple graphical vocabulary for expressing degrees of positive and negative significance. By employing Tiles or similar independent graphical reports, shown together in a common format on the screen of a desktop computer, notebook, tablet, mobile device or wearable interactive display, the invention described here allows the user to see his or her world at a glance.

DETAILED DESCRIPTION

Figure 1:
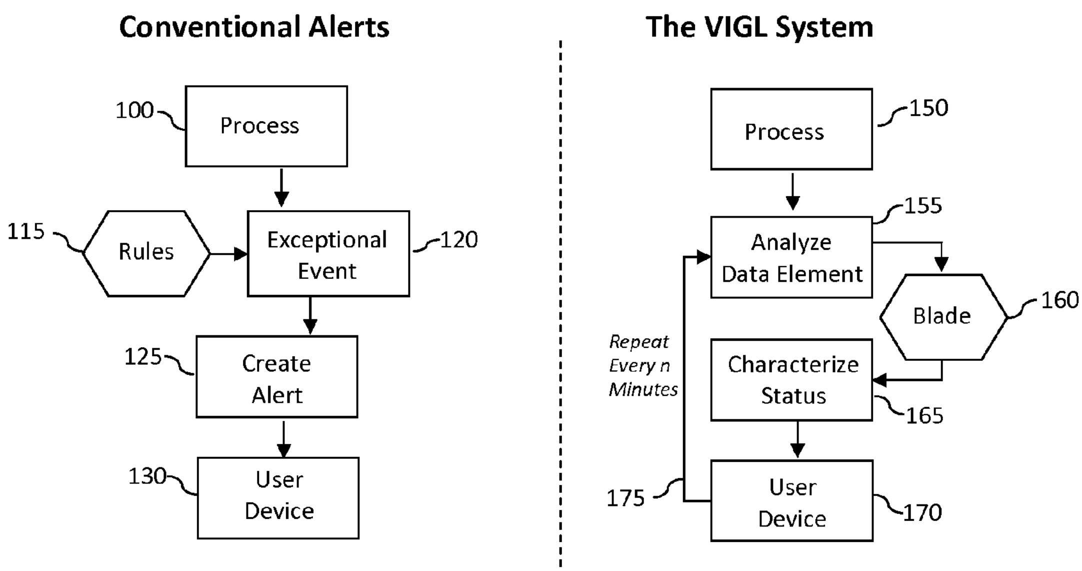
FIG. 1 is a flow chart comparing of traditional alert systems and the invention described here.
Figure 2:
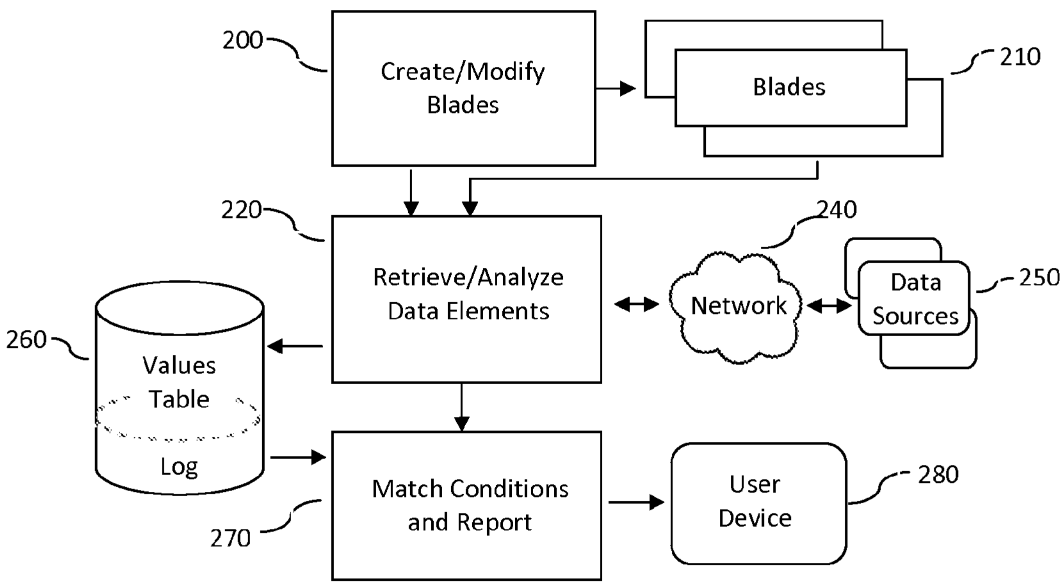
FIG. 2 is an overview of the invention described here, according to one embodiment of the invention.
Figure 3:
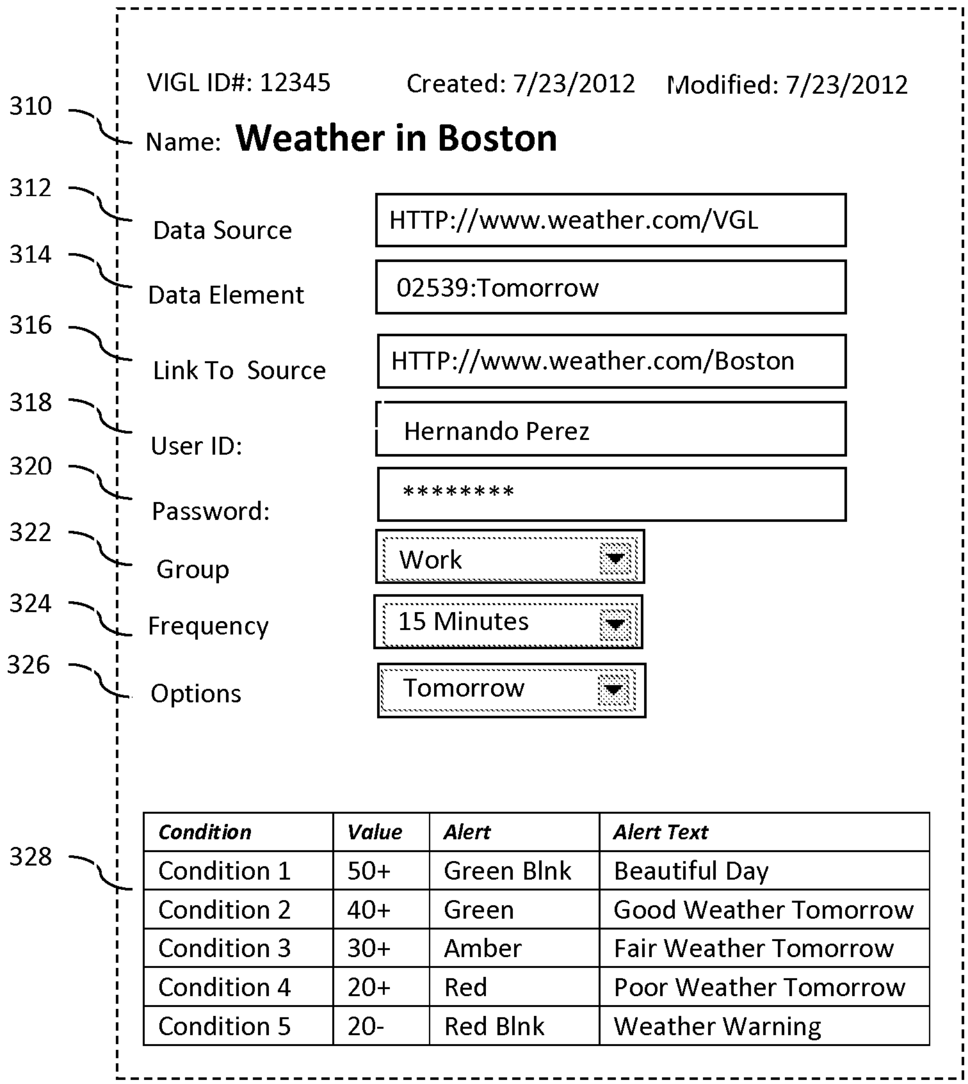
FIG. 3. illustrates some of the elements of the Blade, according to one embodiment of the invention.
Figure 4:
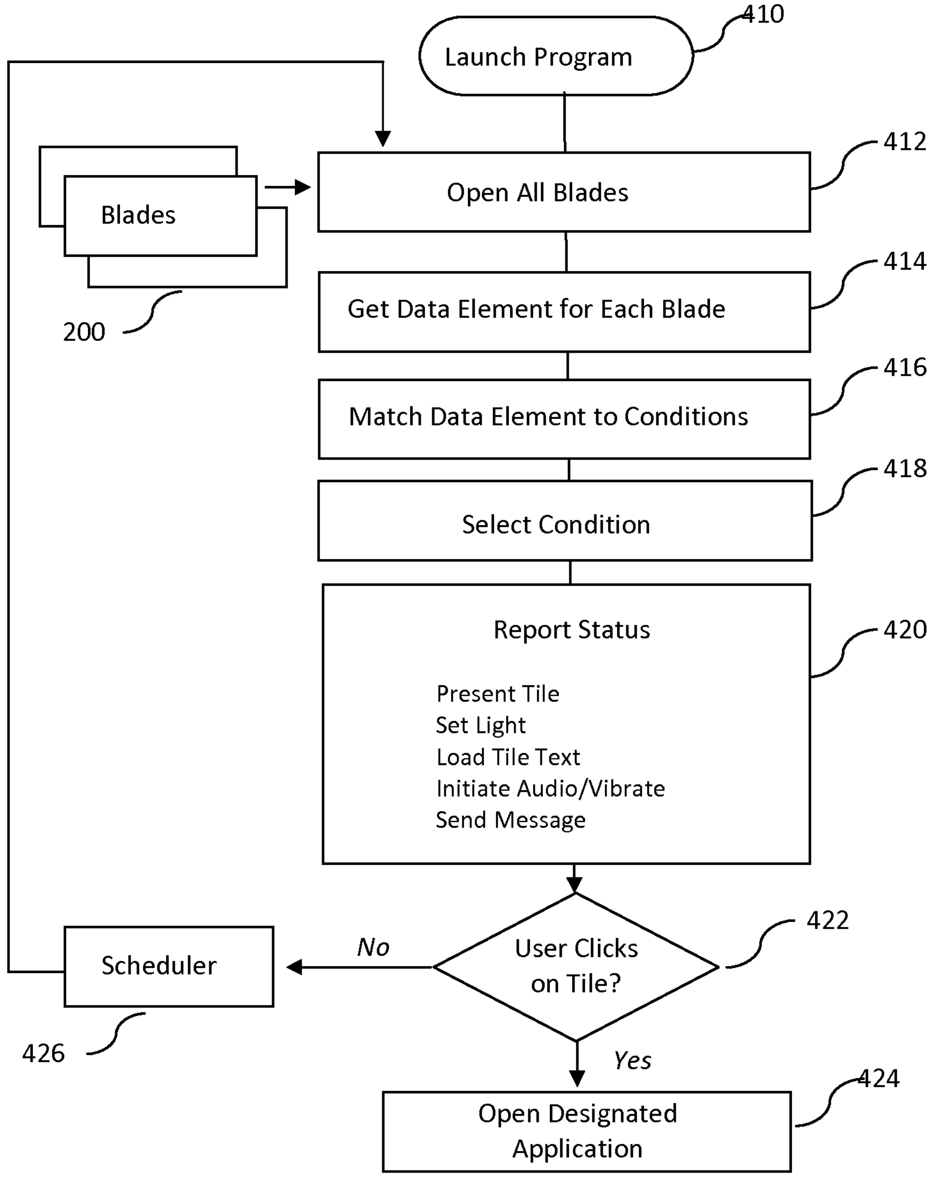
FIG. 4. illustrates the process of analyzing the data element, characterizing the situation and reporting the results.
Figure 5:
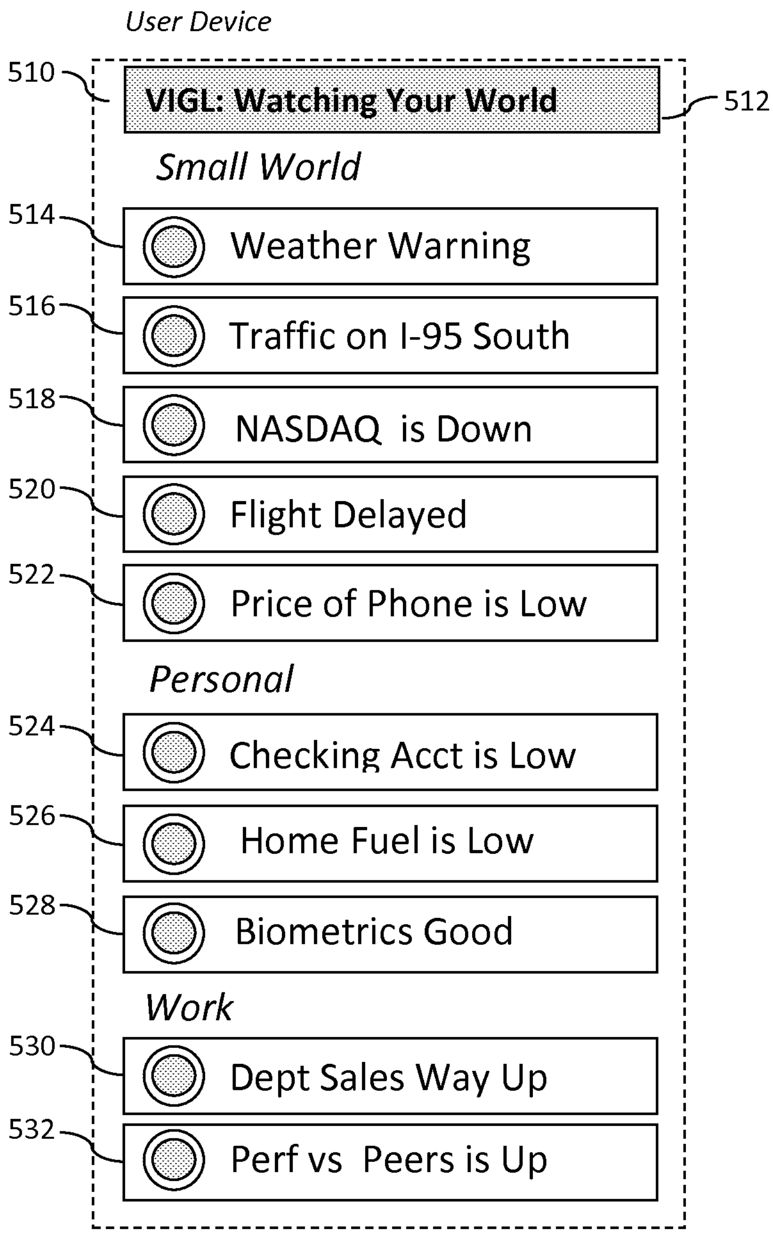
FIG. 5. illustrates the appearance of the system to the user, according to one embodiment of the invention.

FIGS. 1-5 are system block diagrams illustrating some examples of particular embodiments of the invention. The blocks correspond to components of the system depicted. Groupings of system elements and their corresponding functions are shown, along with communication between elements as indicated by connecting lines. Referencing these elements and groupings by the names given is for purposes of convenience, and the drawings merely show one manner of grouping the various elements and functions of particular embodiments of the invention. In different specific embodiments, various groupings of elements and functions and various connections may be used. In different embodiments, the elements and their functions may reside in a single computer system or multiple computer systems or be otherwise organized within a system or systems and may be close to or remote from one another. Moreover, the functions described herein may be in addition to other functions of the system or systems not described herein, or in some embodiments, the functions described herein may be exclusive of other functions.

Each identification herein of particular components or functions performed by the system for doing something or of steps performed in the course of carrying out a method may refer to or encompass a number of possible embodiments, structures, and steps for performing the function(s), including various possible architecture and programming formats. These functions and their communication and/or connections may be provided and performed through the use of various components, computers, computer networks, and other elements and techniques, including hardware, firmware, software, databases, modules, routines, programs, algorithms, engines, plug-ins, or other structures within a computer or system that may be used to provide and/or perform the particular function(s) identified. While the system and its groupings of functions and operations are unique and novel, coding, devising these structures, and devising their architecture are a matter of design choice within the ordinary skill of the art. Moreover, combining or separating one or more functions in or between various components, computers, systems, programs, or program subunits may be accomplished by methods and connectivity protocol and/or devices, e.g., signaling, cabling and/or other electrical data connections, known in the art.

Therefore, the functions identified herein (e.g., in the figures) as within the components of various examples of the system may also be independent of the particular components identified and may be interrelated and/or accessible to the User through various interconnections or otherwise networked in ways known to the art. Each of the functions and components may be close to or remote from one another, either geographically or within a host structure. As noted above, the consolidation of the various functions of the system into the components identified herein is to illustrate the functions and their cooperation and interaction and does not and should not be understood to limit the location of these functions to being within particular components or to limit the location of these components to being within particular structures.

Overview

The invention described here (FIG. 2) consists of three major components: (a) The program (200) opens independent software elements called Blades (210), each of which includes parameters and software designed to analyze a specific Data Element. (b) Once those Blades are opened (220) the program connects over the internet, intranet, Bluetooth, Wi-Fi or other digital information network prescribed in each case (240) and analyzes the indicated Data Elements from the designated local or remote Data Source (250). (c) In each case, the Blade compares the Data Element to a pre-configured set of mutually exclusive Conditions to determine which Condition best describes the current status (270). Then it reports the selected Condition to the User Device (280) in a common format, according to the parameters set for that Blade, for that Condition. The invention described here does not present the actual Data Element to the User as online alert systems do; it characterizes the status of that Data Element using a common graphical vocabulary for expressing degrees of positive and negative significance, permitting the User to determine quickly and without interpretation which of the situations being monitored require closer attention.

Blades

Like the iconic Swiss Army knife that includes many blades for many different situations, the invention described here incorporates one or more independent software elements called "Blades", developed by other information providers, service providers, and independent entities and offered to Users free, for purchase, or by subscription. (FIG. 3) In the preferred embodiment, each blade may include:

a. The Blade Name (310) as it should be displayed on the User Device.

b. The Data Source (312): The Data Source may be local, a URL on the internet, a file on a private intranet, data stored on an appliance accessible over a Bluetooth connection, or another Data Source accessible over another kind of interactive digital information network.

c. The Data Element (314): In the case of HTML Data Sources, the Data Element address specifies the name, attribute, or tag by which the Data Element is identified within the designated Data Source. In the case of Data Elements that are part of a spreadsheet, the address specifies the cell row and column, table name, or other Data Element identifier. In the case of Data Elements that are part of an Access, SQL, Oracle, MySQL, DB2, SyBase, or another commonly used database system, the address includes the name of the element or field. Other protocols for identifying a Data Element within a Data Source may emerge as future software tools and protocols evolve.

In other embodiments, the Data Element may be a body of text and the analysis may be a determination of how often a particular name, product, or phrase has been mentioned, including whether the sentiment of those mentions is positive, negative, or neutral. In still another embodiment, the Data Element may be a live video feed from a security camera, and the analysis may be a determination of whether there has been significant movement in the scene. In still another embodiment the Data Element may be an audio feed, and the analysis may be a determination of whether the current noise is significantly above or below the ambient noise of the scene. The techniques and processes for retrieving and analyzing a data element from a remote file are many and various, and well known in practice by those skilled in the art.

d. Frequency (324): The User may specify for each Blade the frequency with which it should examine the Data Element and run the characterization analysis. There may be some limitations on frequency imposed by the entity that provides the information and that created the Blade.

e. Options (326): The information or service provider may offer the User several Data Elements to choose from in setting up this Blade. For example, the weather information provider may allow the User to monitor Today's weather, Tomorrow's weather, or the Three Day Forecast.

f. Analytic software: The Blade also includes the analytical software necessary to compare the Data Element to the Condition Array and select the condition that best characterizes the Data Element at that moment. In most cases the process of comparing the Data Element to the set of Conditions is a simple numeric one in which each Condition describes one of a range of mutually exclusive values. In other cases the Data Element to be examined may be a non-numerical value like a phrase, a symbol, an audio level, a degree of motion in a video feed, or the instrument reading from a remote appliance or sensing device.

g. The Condition Array (328): The core function of the invention described here is, in the case of each Blade, (a) to examine a Data Element from a very large set of possible values, formats, and sources, (b) select from a customized set of mutually exclusive Conditions the one that best characterizes the current status of that data element, and (c) report that Condition to the user in the form of a simple graphic indicator such as a light (blinking green, green, amber, red and blinking red) and a few words describing the situation being monitored, such as "NASDAQ is Up." Each Blade has a set of Conditions designed for that Data Element, such as "under 20, 20 to 29, 30 to 39, 40 to 49, and 50 and over." The system chooses the Condition that best describes the Data Element, and makes the indicated report as discussed below. In this way, the invention allows the User to scan a diversity of data elements across a broad horizon of complex information situations and get a quick and simple view of the status in each case.

Associated with each Condition are items necessary for the report. These include the color (red, amber, green) and state (steady, blinking, off) of the light to be displayed on the Tile. Also associated with each Condition is the text that will appear on the tile if that Condition is met, for example: "Beautiful Weather Tomorrow, Good Weather Tomorrow, Fair Weather Tomorrow, Poor Weather Tomorrow, or Severe Weather Warning." Also associated with each Condition are other parameters of the report, including images to be retrieved, sounds to be played, messages to be sent and other actions to be taken by the User Device if that Condition is selected.

h. Link to Source (316): In the nominal embodiment, the result of each condition test is reported to the user on an independent "Tile," including a light and a text description of the condition. When the user touches, clicks, or by other means selects the tile, the User Device launches the indicated application, opens the original Data Source, and displays the relevant information. If the link is to a web page, for example, the User Device opens the default Web Browser on the User Device and retrieves the page from the designated URL. The techniques for launching the indicated application and opening the indicated file are many and various, widely employed in commercial applications, and well known to those skilled in the art.

i. User ID and Password. The Blade may include the User ID (318) and Password (320) required by the Data Source. Additional security tests may be imposed on the User when the remote file is opened.

j. User Group (322): The User may assign each Blade to a Group (Home, Work, Financial, Time Off) by which the Tiles may be organized on the User Device. The User can create a Group and assign or reassign Blades at any time.

k. Administrative Data: Each Blade also includes routine administrative data such as when the Blade was created or last modified, the author of the Blade and copyright statements or restrictions that may be appropriate, contact information for customer support, and a link to a home page for the Blade where the User can get additional information, assistance, updates, and other Blades.

Blades are added to the system by downloading them from the information provider and including them in the same directory as the main program. When the program is launched it scans the directory and opens all the Blades that are found. A Blade may be set to "inactive" or it may be removed from the system by removing it from the directory.

Examining Data Elements

Once the program is launched (FIG. 4), the process of examining the Data Elements, analyzing each one against the relevant Condition Array, and reporting the results continues repeatedly according to the frequency required for each Blade, for as long as the program is running. For each Blade, the Data Element is examined from the Data Source (414); it is compared to the Condition Array established for that Blade (416); and the program determines which Condition best characterizes the situation (418). The program does not require any action on the part of the User, and the status of the lights or graphic indicators will change by themselves as the situation changes until the User closes the program or shuts down the User Device. Multiple User Devices may employ instances of the same Blade to interrogate the same Data Element at the same time, subject to the control placed on such access by the information provider.

Reporting the Results

In the nominal embodiment, once the matching Condition has been selected, the program reports the status to the user by presenting or refreshing a "Tile" on the screen (420). In the nominal embodiment this is a small horizontal panel consisting of a graphic indicator and a few words of text. The indicator is set to the color and state corresponding to the selected Condition, for example, blinking green, green, amber, red or blinking red. The text on the Tile describes the situation being reported, using whatever phrase has been associated with that Condition in the Blade. For example, the Data Element from a Data Source maintained by the weather bureau on the internet indicates that a thunder storm is expected in the ZIP code the user has chosen to monitor. Of the Conditions defined by the Blade, the Condition "severe weather tomorrow" is determined to be the best match. So the light on the Tile is blinking red and the text says: "Severe Weather Tomorrow." Some Blades may recognize only two conditions, with the status light limited to either red or green. In other embodiments, other configurations are possible, including more than three states and more than three colors. In other embodiments, the lights and text on a Tile described here may be replaced by other graphic and text indicators that convey the Condition that has been selected.

In addition to displaying a Tile with a light and text on the User Device, the program may report the status of each situation in other ways as well. (a) The Blade may cause a still or animated image to appear on the tile, in place of the text or as background to the text. In other embodiments, the Tile may include a small chart of changes that have recently occurred. (b) The Blade may cause the User Device to play a sound or vibrate when a particular Condition is first determined. (c) The Blade may cause the program to send a predefined message to a predefined email address, or text the message to a predefined User Device. In other embodiments, messages may be sent in other formats as well. (d) The Blade may cause the program to launch a separate application on the User Device, executing a predefined routine appropriate to the situation. These options may be selected by the author of the Blade from among those the program has made available for this User Device, or modified by the user if modifications are permitted.

In all cases, the User may touch, click, or select the Tile on the screen of his or her device (422), causing the device to launch the indicated application and open the file indicated by the Blade, such as launching a Web Browser and examining the weather page for that location. Unless the User chooses to select a Tile, control of the program shifts to the Scheduler module (426) which examines the frequency settings for each of the Blades and determines when the program should next analyze a Data Element.

Tiles

The invention described here is experienced by the User as a set of Tiles (FIG. 5) arranged on the screen of a desktop or notebook computer, tablet, mobile device, gaming device or interactive entertainment system, smart watch, or other wearable interactive digital device. The Tiles are presented in groups as specified by the User, and each Tile is managed by an independent Blade or software module that monitors the status of a remote Data Element. In the nominal embodiment, the tile presents a short description of the status and an indicator light that changes color and state to convey the current Condition.

In the nominal embodiment, Tiles are developed by independent information or service providers and made available for free download, purchase or subscription. In most cases the purpose is to give the User a more efficient way to keep track of a situation or event, and to bring the User to the provider's web site more efficiently. In some cases the Tile is a quick report on a sophisticated analysis, sold by a service provider such as a market analytics provider, a sports handicapper, or a news search and analysis entity.

In the nominal embodiment, the User can access the setup screen for each tile by right clicking on the tile in the case of desktop and notebook computers, or with a touch and hold gesture in the case of tablets, mobile devices and other touch sensitive systems. The setup screen allows the User to edit the Blade Conditions table, change the reporting parameters, change the group to which the Tile belongs and perform other adjustments allowed by the Blade author, including making the tile inactive, or deleting it entirely.

For example, one Blade (514) might be developed and sponsored by the local newspaper to report the status of the weather in the region. Clicking on that tile would bring the User to the newspaper's online weather page. A similar service might be developed and made available by the newspaper, a local radio or TV station to report the status of traffic on a plurality of typical problem routes (516). Clicking on the Tile might bring the User to an ad-supported page with information about the actual problem.

A more complex example might be a Blade that tracks investments (518), made available by subscription from a broker or financial information service. This analysis might measure degrees of positive or negative significance in the current data, incorporating not only the latest price and volume of an investment selected by the User, but also a more sophisticated analysis of technical buy and sell signals that is proprietary to the information provider.

Blades may be offered by existing online services like those that track flight arrival and departure times (520). By reporting the positive or negative status of a particular flight or event this way, the service avoids the overhead on the system of presenting a full HTML page with its graphics, frames, and scripts every time the User checks in. The User also avoids the cognitive task of understanding the context and interpreting the Data Element. The invention described here thus permits both the information provider and the User to monitor the status of a single event repeatedly at a far lower cost.

Shopping sites that track the current online prices for selected products may create a Blade (or multiple blades) allowing the User to watch for the best price (522) without repeatedly calling for the full HTML page and all the overhead that invokes. When the User sees a status report that suggests an interesting situation, he or she can click on the Tile and be taken straight to the full page.

Personal services may provide their customers with a Blade that reports the status of an account, whether it is a checking account (524), unusual activity on a credit card, or the number of minutes remaining on a cell phone account. In some cases, home heating and security systems may post their status to an online database that can in turn be monitored with a custom Blade (526), bypassing the need for updating a web page, and improving the efficiency with which customers can monitor and respond to critical situations. In other embodiments, a video surveillance camera can post an alert to an intermediate database when motion in the video field is greater or less than normal. An audio feed can be monitored to alert the User if there is a noise significantly above or below the ambient level.

As biometrics become a greater part of everyday life (528), sensors designed to send signals to a mobile device over a Bluetooth link might also be interrogated by a Blade, alerting the User to conditions that require attention or mediation. In other embodiments, temperature and humidity sensors may be interrogated, or may post their metrics to an intermediate Data Source, making it possible for the user to monitor a wide array of conditions such as, for example, the temperature and humidity for each sector across a large tract of land under irrigation. In a fleet of taxicabs, the fuel status, average miles per hour, and total fares collected this shift may be retrieved from each car and reported to shift managers and owners who might be driving a taxi themselves.

In still other embodiments, a Blade may be programmed to follow the GPS location of a cell phone—a current capability—and determine whether that family member or company vehicle has gone beyond a radial perimeter, or come within a radial perimeter.

One of the most interesting application opportunities lies in the area of business metrics (530) monitored over an intranet connection. The invention described here permits spreadsheets collecting budget, sales, productivity and traffic data across several divisions to be monitored not only by the managers directly responsible but also by higher levels of management who might otherwise have difficulty keeping up with that detail. Individual managers and other professionals working in a team might use the system to monitor the performance of their peers, or scan a complex process for elements that may have fallen behind schedule. (532).

OBJECTS AND ADVANTAGES

The invention described here offers an improvement over conventional alert systems in the following ways:

Routine reports: The invention described here interrogates the process every few minutes rather than reporting only when an exceptional event occurs, so the user has a better sense of the changing circumstances.

Multiple Situations at the Same Time: The invention described here permits the average user to monitor a wide range of personal and business situations at the same time, and therefore to make correlations that might otherwise be difficult to see, to make a better diagnosis, or devise plans that depend on several variables.

Multiple Tailored Analyses: By employing an array of individual software modules (Blades), each designed to analyze and report the status of a different Data Element, the invention described here is able to analyze a wide range of situations in simple or sophisticated ways, incorporate the software and insights of many independent information and service providers, and evolve each analysis independently as the data and technologies permit.

Simple Characterization: In order to focus the user's attention where and when it is required, the invention described here evaluates the specific data element and characterizes its status using a simple graphical vocabulary for expressing degrees of positive and negative significance. It does not capture and convey the event or the data surrounding it, and does not attempt to diagnose the situation, interpret its importance, or recommend action. It simply allows the user to see the situation at a glance and decide whether additional information is necessary.

Single Application: By bringing the status of many diverse personal and business situations together on a single screen, expressed in a simple graphical vocabulary, the invention described here permits the user to monitor his or her world with a single application running on a desktop computer, notebook computer, tablet, mobile device, digital entertainment system or interactive wearable device.

What is claimed is:

1. A implemented method for analyzing the current status of at least two of a plurality of data elements from local or remote data-sources and converting each said status to one of a common set of symbols that convey the urgency with which said user should examine said data element, consisting of:

(a) the initial establishment by said user of a plurality of at least two mutually exclusive ranges for each said data element to be analyzed, (b) the examination of at least two said data elements in different formats on said systems by an interactive digital device of said user on a schedule determined by said user, (c) the characterization of said status of each said data element as falling within one of said previously established ranges, (d) the conversion of said characterization of each said status into one of a common set of text, graphic, audio or video symbols designed to indicate the urgency with which said user should examine said data element, (e) the presentation of said symbols on the screen of said interactive digital device, whereby said user is able to regularly monitor said status of at least two of said plurality of data elements in different formats from different said systems on said screen of said interactive digital device.

2. The method of claim 1 wherein said data element is part of said local or remote data source in text, data, audio, video, or other digital format.

3. The method of claim 1 wherein said data source is a web page, digital data file, online text file, database, audio or video data stream, biometric reading, or the output of a digital measurement device.

4. The method of claim 1 wherein said analysis and characterization of each said data element is performed by one of a plurality of interchangeable software modules designed for said data element.

5. The method of claim 1 wherein said interactive digital device is selected from one of a desktop or notebook computer, a tablet, mobile device, wearable digital device, entertainment system, onboard information system for cars, boats and planes, or other digital information system.

* * * * *